United States Patent Office 2,985,541
Patented May 23, 1961

2,985,541
PRODUCTS OF SALTS OF LEVULINIC HYDANTOIN

Domenick Donald Gagliardi, East Greenwich, and William J. Jutras, Jr., Peace Dale, R.I., assignors to Argus Chemical Corporation, New York, N.Y.

No Drawing. Filed Aug. 1, 1958, Ser. No. 752,435

5 Claims. (Cl. 117—138.5)

This invention relates to metal salts of the hydantoin of levulinic acid and their condensation product with formaldehyde and is a continuation in part of our patent application, Serial No. 661,577, filed May 27, 1957.

In our parent application, we mentioned that the presence of the COOH groups in the hydantoin of levulinic acid—in the following called LH—and its condensation products with formaldehyde makes it possible to form salts of any metal.

Such products may have numerous uses, depending on the nature of the metal concerned. Condensation products containing Mn, Mg, Co, and Fe may be useful as plant nutrients; Al derivatives could serve as adhesives, and certain salts of Zn, Cu, Ag, and tributyl tin have very interesting bactericidal and mildew-proofing properties.

It is an object of the present invention to prepare various metal salts of LH, especially salts of heavy metals, i.e. those not belonging to the alkali metal group.

Another object is to make monomeric condensation products of such salts with formaldehyde and to condense them to resinous products.

Yet another object is to make copolymer resins of metal salts of LH and urea or melamine with formaldehyde.

A further object of the invention is to use the above-mentioned compounds for bactericidal purposes and mildew-proofing of textiles.

Other objects will appear hereinafter.

The metal salts according to the invention are represented by the formula

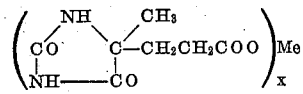

in which Me stands for the desired metal with the exception of the metals of the alkali group, and where the value of $x$ may vary from 1 to 4, depending on the valency of the metal. More particularly, Me also represents the group $(C_4H_9)_3Sn$.

In the preparation of the metal salts we use known methods. The hydantoin derived from levulinic acid is mixed with a metal salt, e.g. the acetate or carbonate, or with a metal oxide or hydroxide, and is reacted in aqueous solution while heating, until the formation of the salt is practically complete.

For preparing the condensation products, we generally proceed by first mixing the selected salt with formaldehyde and heating the mixture for several hours at temperatures ranging from 25° C. to 100° C. until condensation has taken place. The molar ratio of formaldehyde and salt of hydantoin may be from one to two moles of formaldehyde to one mol of hydantoin salt. The condensation is carried out in acid, or alternatively in alkaline medium followed by acidification at pH ranges from 2.0 to 10.0.

When it is desired to make a condensation product by using urea or melamine together with formaldehyde, the condensation is carried out along similar lines. The molar ratio of the three components can vary over a wide range. LH or its metal salts can be a major or minor proportion of the end product.

The curing of these resinous products in their end-use application is effected by heating from 250° to 400° F. until the polymerization has been completed.

The invention will be described more particularly in the following examples, but it should be understood that these are given by way of illustration and not of limitation and that many changes in the details can be made without departing from the spirit of the invention.

Parts are given by weight.

EXAMPLE 1.—PREPARATION OF THE CUPRIC SALT OF LH 74.4 p. LH (0.4 mol), 39.8 p $Cu(OOC \cdot CH_3)_2H_2O$ (0.2 mol) and 100 p. water were mixed together and heated until a dark green solution was obtained. The solution was transferred to an evaporating dish and heated on the boiling water bath for 12 hours, yielding 92 parts of dark green solid. The solid was powderized; it represents 95% of the desired salt and was water-soluble.

EXAMPLE 2

As described in Example 1, the cobalt salt was made from LH and cobaltous acetate.

The final product is a rose-colored powder, containing 94.5% of the desired salt. It is partially soluble in cold water and completely soluble in hot water.

EXAMPLE 3

In essentially the same way, the Zn salt was prepared from LH and ZnO. The salt represents a brittle, pale yellow solid which is easily soluble in water. It fluoresces in visible and U.V. light.

EXAMPLE 4

The aluminum salt of LH was prepared from 55.8 (0.3 mol) LH, 7.8 $Al(OH)_3$ (0.1 mol), 125 $H_2O$, and 18 acetic acid. The mixture was boiled for 15 minutes and since only part of the $Al(OH)_3$ had dissolved, another 25 $H_2O$ and 18 acetic acid were added. After heating to 85° C. for 3 hours, the mixture was clear. Evaporation of the water left a white slurry, which was dried in an oven at 120° C. until all $H_2O$ evaporated. The final product was a light tan salt. It was water soluble.

EXAMPLE 5

Mg salt prepared from LH acid and $MgCO_3$ is a brittle white solid soluble in water.

Other salts were prepared in an analogous way. The following table shows certain properties of salts of LH.

| Anion | Color | Solubility in Water |
|---|---|---|
| Mg | White | Soluble. |
| Mn | Brown | Do. |
| Fe··· | Red brown | Insoluble. |
| Zr | Light brown | Do. |
| Al | Light Tan | Soluble. |
| Zn | Pale Yellow | Do. |
| Co | Rose | Soluble in hot w. |
| Cu | Dark Green | Soluble. |
| Hg | Light Brown | Do. |
| Sn·· | do | Insoluble. |
| Ag | White | Do. |
| $(C_4H_9)_3Sn$ | do | Do. |

The following examples describe the preparation of condensation products of the above-mentioned salts with formaldehyde and also in combination with urea and melamine, wherein the resins are probably copolymers of LH-metal salt-formaldehyde and urea-formaldehyde or melamine-formaldehyde. In these preparations, the salts of LH can be used as starting materials or the condensation can be effected first and the reaction products so obtained be converted into the desired salts.

EXAMPLE 6.—PREPARATION OF A POLYMETHYLENE DERIVATIVE OF Co(LH)$_2$ IN AN AQUEOUS SYSTEM 67.8 p. Co(LH)$_2$ (0.15 mol), 18.2 p. 37% formaldehyde inhibited, (0.225 mol) and 56 p. water were mixed, yielding a pink-colored slurry, pH 5.07. The reaction mixture was heated to 95–98° C. for 2 hours. A reddish-violet solution was obtained, which contained a trace of insoluble material.

5 cc. of this solution were put in a Petri dish and baked at 320° C. for 10 minutes. A brittle violet solid, easily soluble in water, was obtained.

EXAMPLE 7.—PREPARATION OF A METHYLATED POLYMETHYLENE DERIVATIVE OF Cu(LH)$_2$ 68.5 p. Cu(LH)$_2$ (0.15 mol) and 18.2 p. 37% formaldehyde (0.225 mol) were mixed, forming a dry slurry which was diluted with 20 p. H$_2$O and heated to 90° C. for one hour.

The mixture still contained some lumps of undissolved Cu salt. 25 p. methanol were added and the green liquid heated to 85° C. for two hours. Particles of copper salt were filtered and the small quantity of residual copper salt was pasted with methanol and combined with the filtrate. The total mass was heated to about 40° C. under 100 mm. pressure for half an hour and distillation was interrupted because of excessive lumping by precipitation of copper salt. 29 p. methylcellosolve were subsequently added to the green syrup, so that the final product contained approximately 50% methylated polymethylene Cu(LH)$_2$.

A few grams of the reaction product were baked in a Petri dish at 320° F. for 10 minutes. A green film, tacky to the touch and completely water-soluble, resulted.

1 gram of the reaction product was mixed in a Petri dish with 0.5 gram of a 5% ammonium chloride solution and baked at 320° F. for 10 minutes. The resulting film was still water-soluble.

EXAMPLE 8.—METHYLATED POLYMETHYLENE DERIVATIVE OF UREA AND Cu(LH)$_2$ 12.7 p. methanol and 34 p. Methyl Formcel (55% CH$_2$O in methanol) were mixed and adjusted to pH 10.5 by addition of 0.15 gram 20% NaOH. 12 p. urea were added and the mixture refluxed at 80° C. for 2 hours. After one hour, the pH had dropped to 9.6, and after 2 hours to 8.1. At 70° C. 0.23 gram 10% HCl were added, lowering the pH to 4.25. Subsequently, 22.8 p. Cu(LH)$_2$ were added, and the total heated to reflux for one hour. The final reaction product was a clear green resin syrup.

A sample was baked in a Petri dish at 320° F. for 10 min. The resin film was swollen, when immersed in H$_2$O. The addition of aqueous ammonia yielded a blue solution, indicating that the compound was somewhat soluble in water.

When one part of the reaction product was cured with 0.7 p. 5% NH$_4$Cl for 10 minutes at 320° F., a water-insoluble, brittle, greenish-yellow film was obtained. On placing chips of this resin in water, and adding ammonia, the resin chips turned blue, but the water remained completely colorless, indicating that the copper-containing resin was insoluble in water after curing.

EXAMPLE 9

In the same way, the analogous derivative of the (C$_4$H$_9$)$_3$Sn salt of LH was prepared. The final reaction product was not soluble in H$_2$O and has consequently to be applied from solvent solution.

EXAMPLE 10.—METHYLATED POLYMETHYLENE DERIVATIVE OF MELAMINE AND Zn(LH)$_2$ (Mol ratio: 0.8 melamine, 0.2 Zn(LH)$_2$, 6.0 CH$_2$O, and 10.0 methanol)

121.5 p. 37% formaldehyde were adjusted to pH 8 by addition of 0.05 p. NaOH. 25.2 p. melamine were added hereto and the white dispersion heated to 70° C. for 15 min., whereby a faintly hazy solution was obtained. 80 p. methanol acidified with 0.2 p. 37% HCl were added to the mixture, so that the pH of the clear product was lowered to 5.45. Subsequently, 22.7 p. Zn(LH)$_2$ were added (pH became 5.87) and the mixture heated to reflux for 30 minutes. At the end of this time, the resin solution was insoluble in water. A sample of the greenish yellow resin solution was heated to 300° F. for 5 min., yielding a brittle water-insoluble film.

In the same way, the analogous derivative of Cu(LH)$_2$ and the melamine were prepared. The final resin solution was dark green.

EXAMPLE 11.—SILVER SALT OF THE POLYMETHYLENE DERIVATIVE OF LH 50.8 p. LH, 36.4 p. 37% formaldehyde, 1.5 p. Na$_2$HPO$_4$.7H$_2$O, 20.8 p. water and 0.5 p. 20% NaOH, were mixed together and heated to 70° C. The pH of the resulting clear yellow solution was 1.20. The addition of 3.0 p. NaOH raised the pH to 2.90. The solution was then heated to 70° C. for two hours and thereafter cooled to room temperature (pH 2.80). The pH was adjusted to 3.00 by addition of one part 20% NaOH and the solution heated to 70° C. for two more hours. The reaction product was then concentrated by heating at 100 mm. pressure to a solid content of 50%.

To 39.6 p. of this product were added 17.7 p. 20% NaOH, so that the pH became neutral. 17.69 p. AgNO$_3$ were dissolved in 18 parts water and the solution slowly added to the neutralized polymethylene LH product. A curdy white precipitate formed immediately. After standing overnight, the pasty mass was filtered with suction, washed three times with cold water and air-dried in the dark for 5 days. The dried product formed a brownish solid, insoluble in water.

EXAMPLE 12.—SILVER SALT OF A METHYLATED UREA/LH FORMALDEHYDE RESIN

136 Methyl Formcel (2.5 mol) and 51 methanol were mixed and the mixture adjusted to pH 10.5 with 0.95 10% NaOH 48 urea (0.8 mol) were subsequently added and refluxed at 80° C. for 2 hours; cooled to 70° C. and 37.2 powdered LH added, which dissolved in a few minutes; pH of solution was then 4.0. Heated to reflux at 85° C. for 1 hour. The clear solution represents a methylated polymethylene urea/LH resin. Its total weight was 273 grams.

To 27.3 of this solution (containing 0.02 mol LH) 6.18 pts. of 20% NaOH were added, whereby pH was adjusted to 8.4. 5 drops of 50% HNO$_3$ reduced the pH to 6.9. We slowly added a solution of 3.74 AgNO$_3$ in 3.75 H$_2$O. On mixing and stirring, an opaque yellow dispersion was formed (pH 4.95). Silver content of the dispersion was 5.78% Ag.

*Mildew-resistance and bactericidal properties of condensation products of metal salts of LH*

The following treatments were made on cotton sateen fabric to test the mildew resistance and bactericidal properties of metal salts of LH, co-reacted with urea and melamine-formaldehyde resins. A number of controls were run for comparison.

(1) Water control
(2) 10.0% Aerotex M–3 (commercial 80% methylated melamine formaldehyde resin)
  1.0% Catalyst AC (commercial 33% aqueous solution of 2-methyl-2-amino-1-propanol HCl)
  89.0% water (3) 1.3% Cu(LH)₂
10.0% Aerotex M-3
1.0% Catalyst AC
87.7% water
(4) 5.2% Cu(LH)₂ urea.HCHO
10.0% Aerotex M-3
1.0% Catalyst AC
83.8% water
(5) 15.4% Zn(LH)₂ melamine.HCHO
1.0% Catalyst AC
18.0% acetic acid
65.6% water
(6) 14.0% Cu(LH)₂ melamine.HCHO
1.0% Catalyst AC
16.7% acetic acid
68.3% water
(7) 1.2% tributyl tin (LH).urea.HCHO
1.0% Catalyst AC
20.0% butyl Cellosolve (monobutyl ether of ethylene glycol)
77.8% water
(8) 1.7% product obtained according to Example 12
98.3% H₂O The fabrics were padded through water, alcohol or other solvent solutions of the various resinous products so as to deposit 0.14% metal on the cloth. After padding, the treated samples were dried and cured in one operation for 10 minutes at 300° F.

One set of each sample was tested for bactericidal properties by the tentative AATCC Agar Plate Method, which utilizes 0.1 cc. of 24 hour culture of standard strain of *Micrococcus pyogenes* variety *aureus*, incubated for 24 hours at 37° C. on FDA Standard Agar. The results of bactericidal effects of the cloth are reported in terms of:

| Ratings | Bacterial Inhibition, percent Effective |
|---|---|
| Excellent | 100 |
| Good | 75 |
| Fair | 50 |
| Poor | 25 |
| Unsatisfactory | 0 |

The bactericidal properties of the samples were tested after the treatment above and after the samples had been given 5 launderings in an Easy Automatic Washer using soap and soda ash.

The results of these tests are given in Table I. These show that the various metal-LH resins have bactericidal properties on cloth. All of them also show varying durability to multiple washes. This durability with some of the resins is very significant, since there are few commercial treating products that can pass a multiple washing test.

TABLE I.—BACTERIAL INHIBITION PROPERTIES OF COTTON SATEEN TREATED WITH VARIOUS METAL-LH RESINS

| Treatment No. | Bacterial Inhibition | |
|---|---|---|
| | Originals | After 5 Washes |
| 1 | Unsatisfactory | Poor. |
| 2 | Excellent | Fair. |
| 3 | do | Good+. |
| 4 | do | Excellent. |
| 5 | do | Fair. |
| 6 | do | Do. |
| 7 | do | Excellent. |
| 8 | do | |

TABLE II.—MILDEW RESISTANCE PROPERTIES OF COTTON SATEEN TREATED WITH VARIOUS METAL-LH RESINS

| Treatment | Percent Strength Retained After 2 Weeks' Burial |
|---|---|
| 1. Control | 0 |
| 2 | 35 |
| 3 | 55 |
| 4 | 55 |
| 5 | 46 |
| 6 | 52 |
| 7 | 96 |
| 8 | 94 |

In Table II are shown the results of two weeks' soil burial tests made on the above samples. Here the Federal Specification CCC-T-191b, Method 5762 was employed. The results are given in terms of the percent strength loss produced during the soil burial period. Some of the metal-LH resins showed mildew resistance. The tributyl tin oxide-LH salt resin and the silver-containing resin were excellent. Some protection was shown by several of the copper and zinc resins.

We claim:
1. A resin comprising a condensation product of formaldehyde with a metal salt of levulinic hydantoin having the formula

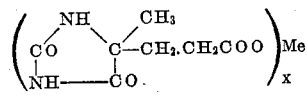

wherein Me stands for a metal selected from the group consisting of silver and polyvalent metals and the group (C₄H₉)₃Sn, and x is an integer depending on the valency of the metal, said formaldehyde and said salt being condensed in the molar ratio of about 1.0 to 3.0 moles of formaldehyde for 1 mol of the salt.

2. A resin comprising a copolymer of formaldehyde and urea with a metal salt of levulinic hydantoin having the formula

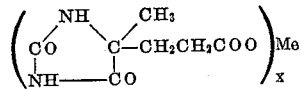

wherein Me stands for a metal selected from the group consisting of silver and polyvalent metals and the group (C₄H₉)₃Sn, and x is an integer depending on the valency of the metal.

3. A resin comprising a copolymer of formaldehyde and melamine with a metal salt of levulinic hydantoin having the formula

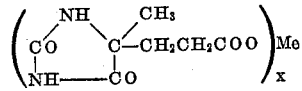

wherein Me stands for a metal selected from the group consisting of silver and polyvalent metals and the group (C₄H₉)₃Sn, and x is an integer depending on the valency of the metal.

4. A process for the treatment of textiles to make them resistant to mildew and bacterial action, which comprises padding a fabric through a solution containing from 1–20% of a resin according to claim 2.

5. A process for the treatment of textiles to make them resistant to mildew and bacterial action which comprises padding a fabric through a solution containing from 1 to 20% of a resin according to claim 3.

References Cited in the file of this patent

UNITED STATES PATENTS

| 2,532,278 | Chadwick | Dec. 5, 1950 |
| 2,642,459 | White | June 16, 1953 |
| 2,658,912 | Pfister et al. | Nov. 10, 1953 |
| 2,764,573 | Reibnitz et al. | Sept. 25, 1956 |